US007170265B2

(12) United States Patent
Whittaker

(10) Patent No.: US 7,170,265 B2
(45) Date of Patent: Jan. 30, 2007

(54) VOLTAGE REGULATOR CIRCUIT WITH TWO OR MORE OUTPUT PORTS

(75) Inventor: Edward J. W. Whittaker, Bishop's Stortford (GB)

(73) Assignee: SiGe Semiconductor Inc., Ottawa (CA)

( * ) Notice: Subject to any disclaimer, the term of this patent is extended or adjusted under 35 U.S.C. 154(b) by 0 days.

(21) Appl. No.: 11/100,381

(22) Filed: Apr. 7, 2005

(65) Prior Publication Data

US 2006/0226821 A1 Oct. 12, 2006

(51) Int. Cl.
*G05F 1/577* (2006.01)
*G05F 1/44* (2006.01)
*H02J 3/00* (2006.01)

(52) U.S. Cl. ........................ 323/267; 307/38; 323/269

(58) Field of Classification Search ................ 323/267, 323/268, 269, 270, 273, 274, 275, 280–281; 307/38, 39

See application file for complete search history.

(56) References Cited

U.S. PATENT DOCUMENTS 5,336,986 A * 8/1994 Allman ........................ 323/268
5,550,700 A * 8/1996 Moore et al. ............... 361/101
5,717,319 A * 2/1998 Jokinen ....................... 323/280
6,084,386 A * 7/2000 Takahashi et al. .......... 323/273
6,222,353 B1 * 4/2001 Pattamatta et al. ......... 323/269
6,232,753 B1 * 5/2001 Pasotti et al. ............... 323/267
6,236,194 B1 * 5/2001 Manabe et al. ............. 323/274
6,667,604 B2 * 12/2003 Yanagisawa ................ 323/274
6,677,735 B2 * 1/2004 Xi ............................. 323/273
6,677,809 B2 * 1/2004 Perque et al. ............... 327/541
6,680,837 B1 * 1/2004 Buxton ...................... 361/93.9
6,710,584 B2 * 3/2004 Kuroiwa et al. ............ 323/281
6,765,374 B1 * 7/2004 Yang et al. ................. 323/280
6,909,320 B2 * 6/2005 Chan et al. ................. 327/541
7,068,019 B1 * 6/2006 Chiu .......................... 323/281
7,071,664 B1 * 7/2006 Teggatz et al. ............. 323/280
7,071,736 B2 * 7/2006 Wikstrom .................... 326/95
2006/0007618 A1 * 1/2006 Leyk et al. ................... 361/90

OTHER PUBLICATIONS

Sedra and Smith, Microelectronic Circuits, 1989, Third Edition, Saunders Publishing, p. 299.*

* cited by examiner

*Primary Examiner*—Karl Easthom
*Assistant Examiner*—Harry R Behm
(74) *Attorney, Agent, or Firm*—Kenyon & Kenyon LLP

(57) ABSTRACT

A dual output voltage regulator circuit is disclosed. The output voltage regulator has a first FET and a second FET. A current source responsive to the regulated output voltage provides a current drive to the gate of the first FET in a first mode of operation and to the gate of the second FET in a second mode of operation. Further, the circuit employs switches for switchably selecting between the first mode of operation and the second mode of operation.

17 Claims, 3 Drawing Sheets

VOLTAGE REGULATOR CIRCUIT WITH TWO OR MORE OUTPUT PORTS

FIELD OF THE INVENTION

The invention relates to the field of voltage regulator circuits and more specifically to voltage regulator circuits with two or more switchably selectable outputs.

BACKGROUND OF THE INVENTION

In typical electronic circuits, the IC circuit is designed to operate from a specific supply voltage, which is generally assumed to be constant. It is well known that a voltage regulator is used in such circuits to provide a constant DC output voltage. The voltage regulator includes circuitry that accounts for changes in load current or input voltage and adjusts such that the output voltage remains stable. For example, a feedback loop is provided wherein sensing of the output voltage is performed to allow for adjusting the output voltage to maintain same at a desired voltage.

U.S. Pat. No. 5,559,423 discloses a voltage regulator circuit including a linear transconductance amplifier with a field effect transistor (FET) as a regulating device. However, in the case where a bias feed to 2 or more GaAs PAs is required such as for a WLAN or WiMAX application where any one of PAs might be energized by the application of bias at any one time, a voltage regulator circuit with 2 or more output ports is required.

In U.S. patent Ser. No. 10/377,781 Liu et al. discloses a dual-output linear voltage regulator circuit using two voltage regulator units and a total of 3 MOSFETs to provide two terminal regulated voltages, where the second voltage is half of the first voltage. Unfortunately since the MOSFETS require significant semiconductor die area within the integrated circuit, the approach is disadvantageous as it uses 3 MOSFETs.

A need therefore exists for a compact voltage regulator with two or more switched outputs that offers a reduction in silicon die area compared to Prior Art circuits including those that employ two separate regulators or one regulator and 2 CMOS switches to provide dual output ports.

SUMMARY OF THE INVENTION

In accordance with the invention there is provided a voltage regulator comprising: a first FET having a first source coupled to an input terminal for receiving a voltage to be regulated, a first drain coupled to a first output terminal for providing a regulated output voltage therefrom, and a first gate; a second FET having a second source coupled to the input terminal, a second drain coupled to a second output terminal for providing of a regulated output voltage therefrom, and a second gate; a current source responsive to the regulated output voltage for providing a current drive to the first gate and other than to the second gate in a first mode of operation and to the second gate and other than to the first gate in a second other mode of operation; and, at least a switch for switchably selecting between the first mode of operation and the second mode of operation.

In accordance with another aspect of the invention there is provided a method of regulating a voltage to provide a regulated voltage comprising: providing a current source; providing feedback to the current source and based on the regulated voltage for adjusting the current source in response to changes in the regulated voltage; providing a first regulating output FET; providing a second regulating output FET; and, switchably selecting between the first regulating output FET to provide the regulated voltage from an output port thereof and the second regulating output FET to provide the regulated voltage from an output port thereof, the first FET and the second FET electrically coupled to a voltage source absent a regulating output FET disposed therebetween.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
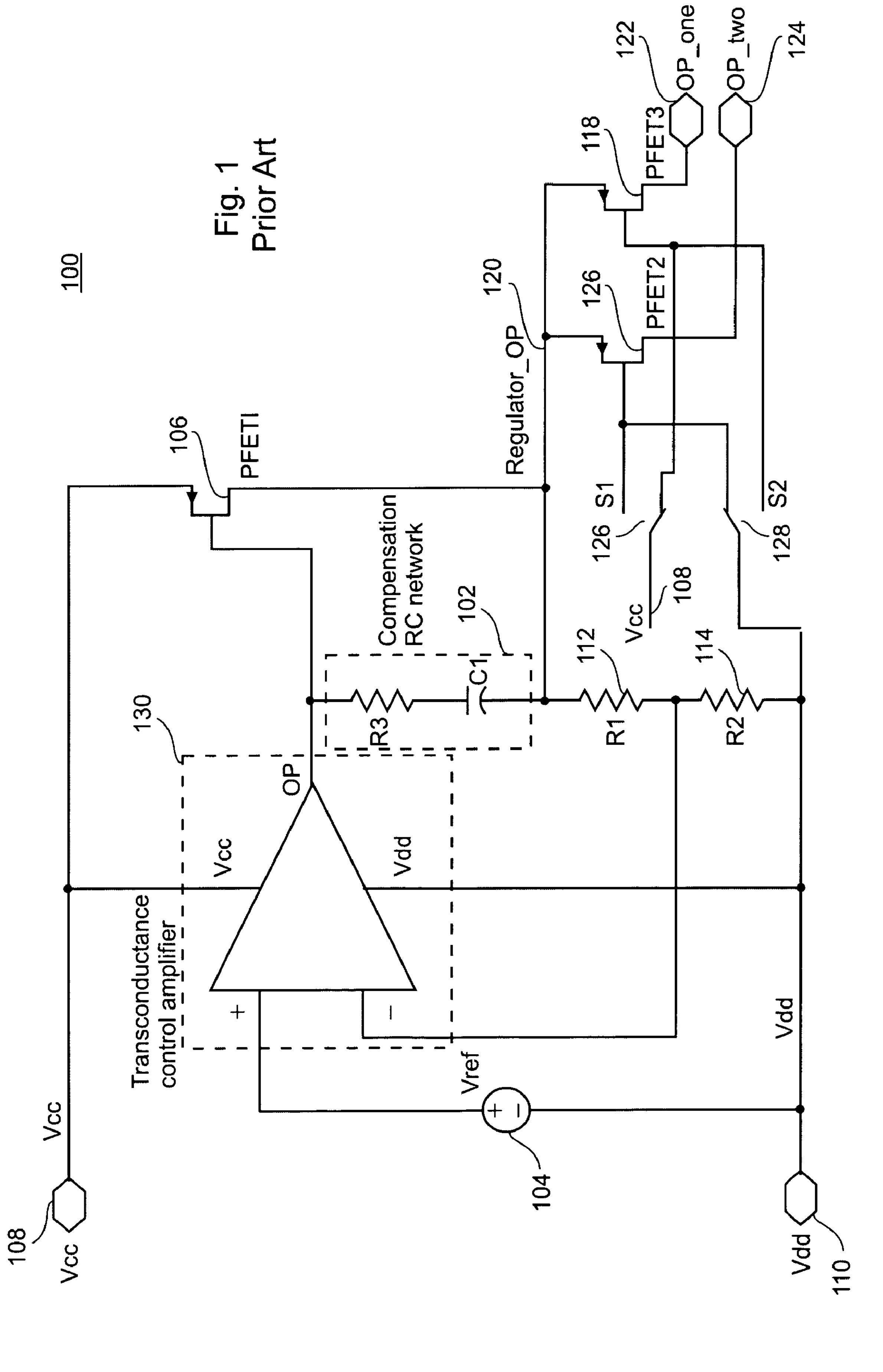
Fig. 1 Prior Art
FIG. 1 illustrates a prior art voltage regulator circuit with 2 switched outputs.

FIG. 1 illustrates a prior art voltage regulator circuit 100. A positive channel Field effect transistor (PFET) PFET1 106 is a voltage regulating element thereof. The PFET 106 has a gate driven from a current source in the form of an output of an operational transconductance control amplifier 130. The transconductance control amplifier is disposed between a first voltage port Vcc 108 and a second voltage port Vdd 110.

A non-inverting (+) input of the transconductance control amplifier is coupled to a voltage reference source (Vref) 104, which is relative to the second voltage port Vdd 110. An inverting (−) input of the transconductance control amplifier is coupled to a tapping point of a potential divider formed by a first resistor R1 112 and a second resistor R2 114. The first resistor R1 112 is further coupled to the compensation RC network. The compensation RC network 102 provides frequency compensation and includes a third resistor R3 disposed in series with a capacitor C1 wherein the compensation RC network is further disposed between the output port of the transconductance control amplifier 130 and a drain of PFET1 106. The compensation RC network components R3 and C1 are toleranced depending on the intended load to be driven by the regulator.

Further coupled to the drain of PFET1 106 is a source of a FET transistor PFET2 116 and a source of another FET transistor PFET3 118 wherein PFET2 116 and PFET3 118 are regulator selector switches. This is a typical configuration where the source of voltage regulating FET 106 is coupled to the positive supply voltage and the drain of the FET 106 is connected to a load through PFET selector switches 116 and 118.

Coupled to the gate of PFET2 is a switch S1 108 and another switch S2 128. Coupled to the switch S1 108 is the first voltage port Vcc 108 for providing a voltage to the selector switch S1 108 for selecting a first mode of operation or a second other mode of operation. Coupled to the gate of PFET3 is a switch S1 108 and an other switch S2 128. Coupled to the switch S2 128 is the second voltage port Vdd 110 for providing a voltage to the selector switch S2 128 for selecting the first mode of operation or the second other mode of operation.

The first mode of operation is for selecting an output port 122; the second mode of operation is for selecting an other output port 124 thereby providing a voltage regulator with switchably selectable outputs.

Prior to the two PFET switches PFET2 116 and PFET3 118, the regulated output voltage (Vout) 120 of the prior art voltage regulator circuit is defined by the following equation:

$$Vout=Vref*(R1+R2)/R2 \quad (1)$$

For the condition that PFET1 is in triode region, the die area is optimized and the smallest die is achieved when the OP pin of the transconductance control amplifier 130 falls as near as possible to Vdd.

The regulator selector switches PFET2 116 and PFET3 118 are outside the feedback control loop of the voltage regulator circuit 100. Therefore, the voltage drop across the regulator selector switches PFET2 116 and PFET3 118 is not compensated for. This requires the regulator selector switches PFET2 116 and PFET3 118 to be substantially larger in die size than PFET1 106. The result is a voltage regulator block 100 with two switched output ports where the die size of the regulator block 100 is physically larger than the case with two separate voltage regulator blocks providing dual outputs.

Figure 2:
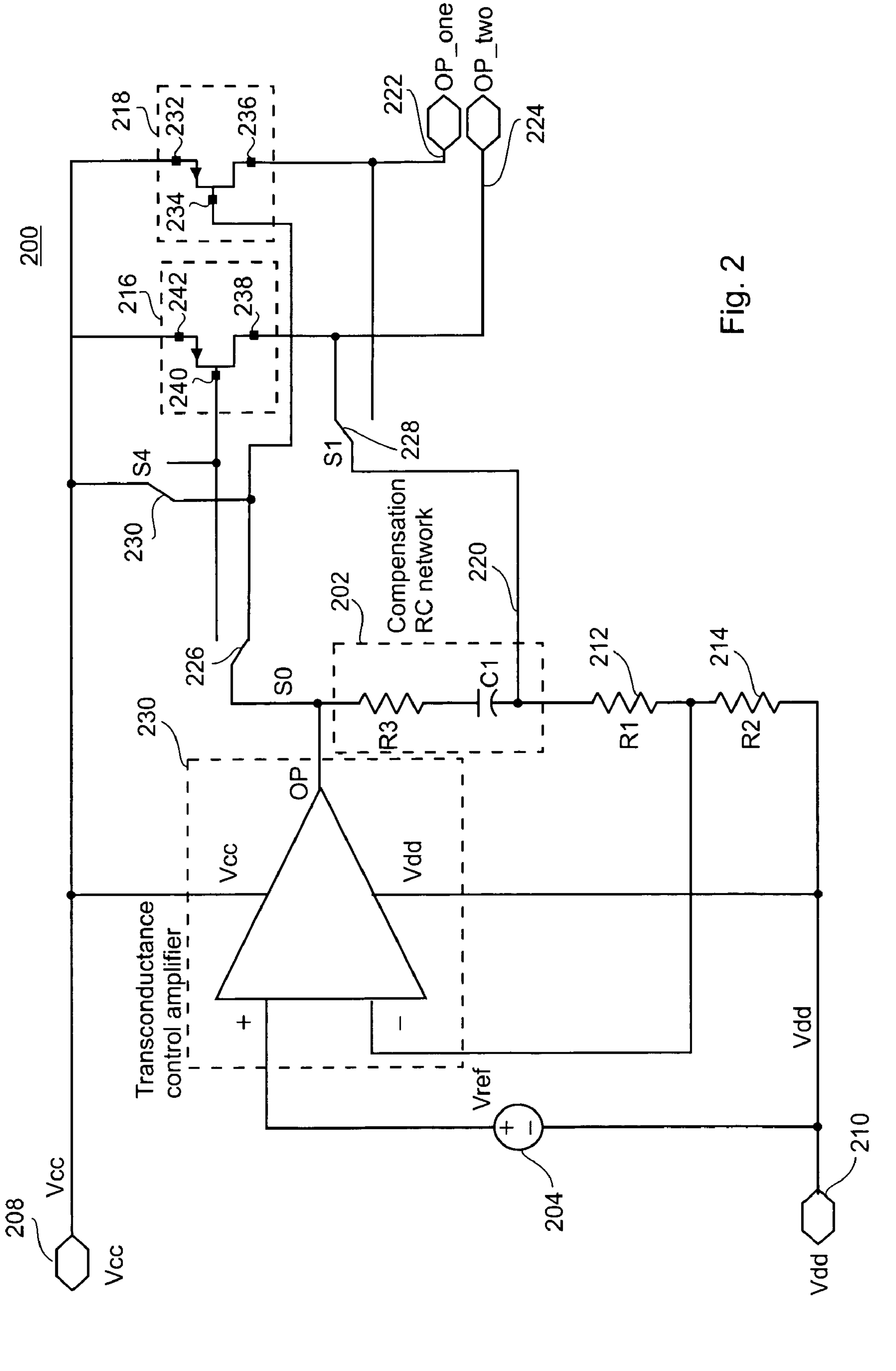
FIG. 2 illustrates a voltage regulator circuit with two switched outputs according to an embodiment of the instant invention; and, FIG. 3 illustrates a voltage regulator circuit with three switched outputs according to another embodiment of the instant invention.

In a first embodiment of the instant invention, FIG. 2 illustrates a dual output voltage regulator circuit 200 providing switchably selectable output ports. Absent is a voltage-regulating element analogous to PFET1 106 as shown in FIG. 1. In this embodiment, the output signal of the transconductance control amplifier 230 is a current source driving a first gate 240 of a first p-channel FET 216 in a first mode of operation and a second gate 234 of a second p-channel FET 218 in a second mode of operation. The transconductance control amplifier 230 is disposed between a first voltage port Vcc 208 and a second voltage port Vdd 210.

A non-inverting (+) input port of the transconductance control amplifier is coupled to a voltage reference source (Vref) 204 wherein the voltage reference source Vref is further coupled to the second voltage port Vdd 210. An inverting (−) input port of the transconductance control amplifier is coupled to a tapping point of a potential divider formed by a first resistor R1 212 and a second resistor R2 214. The first and second resistor R1 212 and R2 214 are for setting the desired output regulator voltage. The first resistor R1 212 is further coupled to the compensation RC network 202. The compensation RC network 202 provides frequency compensation and includes a third resistor R3 disposed in series with a capacitor C1 wherein the compensation RC network is further disposed between the output port of the transconductance control amplifier 230 and a selector switch S1 228. Typically, the compensation RC network components R3 and C1 are toleranced depending on the nature of the load to be driven by the regulator.

In the first mode of operation, coupled to the selector switch 228 is the first drain 238 of the first FET 216 wherein the first source 242 of the first FET 216 is for receiving the voltage on the first voltage port 208. In the same mode of operation, coupled to the first gate 240 of the first FET 216 is the selector switch 226. The selector switch 226 is connected to both the output port of the transconductance control amplifier 230 and the compensation RC network wherein the output port of the transconductance control amplifier provides the output current used to drive the first and the second FETs in both modes of operation.

In the second mode of operation, coupled to the first gate 240 of the first FET 216 is the selector switch 230 further coupled to the voltage input port 208. In both modes of operation, the second FET 218 is coupled through the second source 232 to a voltage port 208. In a first mode of operation the second drain 236 of the second FET 218 is connected to the first output port 222 of the voltage regulator circuit. In the second mode of operation the second drain 236 of the second FET 218 is connected to the first selector switch 228 coupled to the compensation RC network 202 and the first resistor R1 212.

The output voltage of the regulator at output ports 222 and 224 is described by equation (1).

The first mode of operation is actuated when selector switches 226, 228 and 230 enable the first voltage regulator output port 222. The second mode of operation is actuated when selector switches 226, 228 and 230 enable the second voltage regulator output port 224. The combination of the switches thereby provides a voltage regulator with switchably selectable output ports.

Further advantageously, the selector switches 226, 228 and 230 are compact, low current CMOS switches thereby using little die area compared to either the first FET 216 or the second FET 218 or the reference voltage 204 and control circuitry.

Optionally, the selector switches 226, and 228 are complementary n-channel FET and p-channel FET transistor switches where selector switch 230 only uses p-channel FETs as the switching element. In this embodiment of the instant invention, the first and second FET switches 216 and 218 are each approximately same size, having a similar dimension to FET 106—similar in orders of magnitude. Advantageously, this allows a dual-output voltage regulator requiring less die area than the prior art.

As per another embodiment of the invention, the addition of further FETs in a similar configuration to that of the first FET 216 and the second FET 218 coupled to additional selector switches arranged in similar configurations to that of selector switches 226, 228, 230 allows the dual output voltage regulator 200 to provide three or more regulated switchably selectable outputs voltages.

Figure 3:
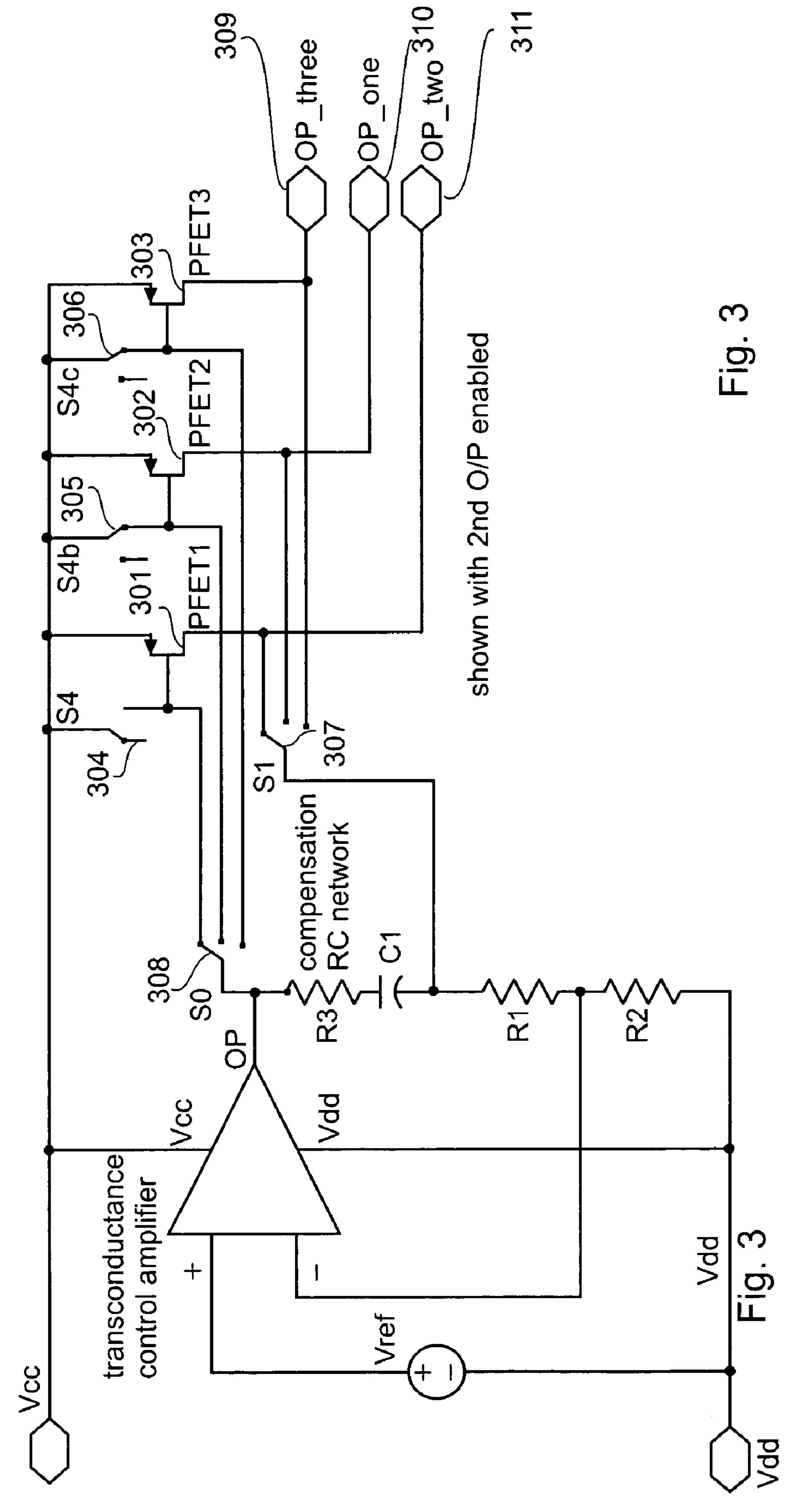

Referring now to FIG. 3, shown is a voltage regulator circuit 300 with 3 switchably selectable output ports. Similar to FIG. 2, the circuit comprises a linear transconductance control amplifier, a control loop formed by a feedback control path, and switchably driven voltage-regulating FETs. The feedback control path has an output port switchably coupled to a first gate of the first voltage regulating FET 301 in a first mode of operation, to a second gate of the second voltage regulating FET 302 in a second mode of operation and to a third gate of the third voltage regulating FET 303 in a third other mode of operation.

Selector switches S0 308, S1 307, S4 304, S4*b* 305, S4*c* 306 have been added to allow for a third switchably selectable output port. The switch configuration shown in FIG. 3 is one example of the switch settings such that the second output port 311 is enabled. Accordingly, other switch settings will enable the other two output ports 309 and 310. According to this embodiment of the invention, selector switches S0, S1, S4, S4*b*, and S4*c* allow for a third switchably selectable output port. Selector switches S0, S1, S4, S4*b*, and S4*c* are compact low current CMOS switches using little die area compared to either of the three PFETs 301, 302, 303 or the voltage reference source and control circuits.

Numerous other embodiments may be envisaged without departing from the spirit or scope of the invention.

What is claimed is:

1. A voltage regulator comprising:

a first FET having a first source coupled to an input terminal for receiving a voltage to be regulated, a first drain coupled to a first output terminal for providing a first regulated output voltage therefrom, and a first gate;

a second FET having a second source coupled to the input terminal, a second drain coupled to a second output terminal for providing of a second regulated output voltage therefrom, and a second gate;

a current source providing a current drive to the first gate and other than to the second gate in a first mode of operation and to the second gate and other than to the first gate in a second other mode of operation, the current source responsive to the first regulated output voltage in the first mode of operation and the second regulated output voltage in the second other mode of operation; and, at least a switch for switchably selecting between the first mode of operation and the second mode of operation.

2. A voltage regulator according to claim 1, wherein in the first mode of operation the first regulated output voltage at the first output port is dependent upon characteristics of the first FET.

3. A voltage regulator according to claim 2, wherein in the second mode of operation the second regulated output voltage at the second output port is dependent upon characteristics of the second FET.

4. A voltage regulator according to claim 1, wherein the current source is a transconductance control amplifier.

5. A voltage regulator according to claim 4, comprising:

a potential divider coupled to a first output terminal in a first mode of operation and to a second output terminal in a second mode of operation, wherein the transconductance control amplifier has differential input ports coupled to a tapping point within the potential divider and to a reference voltage, respectively.

6. A voltage regulator according to claim 5, wherein the reference voltage comprises a reference voltage source integrated within a same semiconductor die as the transconductance control amplifier.

7. A voltage regulator according to claim 5, wherein the at least a switch comprises three CMOS switches for switching a signal provided to the gate and the drain of the first FET and of the second FET for selecting between the first mode of operation and the second other mode of operation.

8. A voltage regulator according to claim 5, wherein the first FET and the second FET are disposed within a control loop with the transconductance control amplifier for compensating the voltage drop across each of the first and second FETs.

9. A voltage regulator according to claim 1, wherein the at least a switch comprises three CMOS switches for switching a signal provided to the gate of the first FET and of the second FET for selecting between the first mode of operation and the second other mode of operation.

10. A voltage regulator according to claim 9, wherein two of the CMOS switches are complimentary NFET and PFET switches.

11. A voltage regulator according to claim 1, absent a third FET for providing of a regulated voltage to the first FET and second FET.

12. A voltage regulator according to claim 11, integrated within a same semiconductor die.

13. A voltage regulator according to claim 1, integrated within a same semiconductor die.

14. A voltage regulator circuit according to claim 1, comprising:

a third FET having a third source coupled to an input terminal for receiving a voltage to be regulated, a third drain coupled to a third output terminal for providing a regulated output voltage therefrom, and a third gate;

wherein the current source is for providing a current drive to third gate and other than to the first gate and the second gate in a third mode of operation, the current source for other than providing current to the third gate in each of the first and second modes of operation, and, wherein the at least a switch is for switchably selecting between the first mode of operation, the second mode of operation and the third mode of operation.

15. A voltage regulator according to claim 14, wherein the current source is a transconductance control amplifier.

16. A voltage regulator according to claim 15, comprising:

a potential divider coupled to a first output terminal in a first mode of operation, to a second output terminal in a second mode of operation and to a third output terminal in a third mode of operation, wherein the transconductance control amplifier has differential input ports coupled to a tapping point within the potential divider and to a reference voltage, respectively.

17. A voltage regulator according to claim 16, wherein the first FET, the second FET and the third FET are disposed within a control loop with the transconductance control amplifier for compensating the voltage drop across each of the first, second and third FETs.

* * * * *